(12) United States Patent
Nuggehalli et al.

(10) Patent No.: US 8,107,103 B2
(45) Date of Patent: Jan. 31, 2012

(54) PRINT DRIVER FOR PRINTING POLICY-ENABLED ELECTRONIC DOCUMENTS USING LOCKED PRINTING

(75) Inventors: Jayasimha Nuggehalli, Cupertino, CA (US); Seiichi Katano, Cupertino, CA (US); Seong Kim, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 773 days.

(21) Appl. No.: 12/166,741

(22) Filed: Jul. 2, 2008

(65) Prior Publication Data

US 2010/0002248 A1    Jan. 7, 2010

(51) Int. Cl.
*G06K 15/00* (2006.01)
*G06F 15/00* (2006.01)

(52) U.S. Cl. .......................... 358/1.14; 358/1.6; 358/1.9

(58) Field of Classification Search ................. 358/1.15, 358/1.13, 442, 1.9, 446, 1.14, 448
See application file for complete search history.

(56) References Cited

U.S. PATENT DOCUMENTS

| | | | |
|---|---|---|---|
| 5,880,447 A | 3/1999 | Okada et al. | |
| 6,938,154 B1 | 8/2005 | Berson et al. | |
| 6,970,259 B1 | 11/2005 | Lunt et al. | |
| 7,002,703 B2 | 2/2006 | Parry | |
| 7,079,269 B2 | 7/2006 | Teeuwen et al. | |
| 7,110,541 B1 | 9/2006 | Lunt et al. | |
| 7,170,623 B2 | 1/2007 | Matoba et al. | |
| 7,359,076 B2 | 4/2008 | Uchino | |
| 7,382,487 B2 | 6/2008 | Ikegami | |
| 7,609,412 B2 | 10/2009 | Maruyama | |
| 7,660,803 B2 | 2/2010 | Jin | |
| 7,667,865 B2 | 2/2010 | Ciriza et al. | |
| 7,697,760 B2 | 4/2010 | Kwok et al. | |
| 2001/0029521 A1 | 10/2001 | Matsuda et al. | |
| 2001/0038462 A1 | 11/2001 | Teeuwen et al. | |

(Continued)

FOREIGN PATENT DOCUMENTS

EP    1 091 275    4/2001

(Continued)

OTHER PUBLICATIONS

European Patent Office, "European Search Report", European patent application EP 08 16 0705, dated Nov. 12, 2008, 10 pages.

(Continued)

*Primary Examiner* — Jerome Grant, II
(74) *Attorney, Agent, or Firm* — Hickman Palermo Truong & Becker LLP; Edward A. Becker

(57) ABSTRACT

An approach is provided for printing policy-enabled electronic documents using locked printing. A client device includes a user interface, an application program and a print driver. The application program allows a user to generate an electronic document. The print driver corresponds to a particular printing device and is configured to cause a graphical user interface to be displayed on the user interface. The graphical user interface allows a user to specify one or more access policies to be applied to the electronic document. The print driver is configured to generate print data that includes a plurality of print commands which, when processed by the particular printing device, cause a printed version of the electronic document to be generated at the printing device. The print data includes data that indicates the one or more attributes of the one or more access policies that are to be applied to the electronic document.

18 Claims, 11 Drawing Sheets

U.S. PATENT DOCUMENTS

| | | | |
|---|---|---|---|
| 2002/0023143 | A1 | 2/2002 | Stephenson et al. |
| 2002/0097431 | A1 | 7/2002 | Ikegami |
| 2002/0120855 | A1 | 8/2002 | Wiley et al. |
| 2003/0065404 | A1 | 4/2003 | Bhatti |
| 2003/0090696 | A1 | 5/2003 | Willis et al. |
| 2003/0090697 | A1 | 5/2003 | Lester et al. |
| 2004/0088378 | A1 | 5/2004 | Moats |
| 2004/0165216 | A1* | 8/2004 | Nauta .................... 358/1.15 |
| 2004/0169884 | A1 | 9/2004 | Yamada |
| 2004/0257601 | A1 | 12/2004 | Tomiyasu et al. |
| 2005/0094195 | A1 | 5/2005 | Sakamoto et al. |
| 2005/0141013 | A1 | 6/2005 | Kikuchi et al. |
| 2005/0254086 | A1 | 11/2005 | Shouno |
| 2005/0276618 | A1 | 12/2005 | Clement et al. |
| 2006/0017954 | A1 | 1/2006 | Ly et al. |
| 2006/0285141 | A1* | 12/2006 | Kim et al. .................... 358/1.13 |
| 2007/0019224 | A1* | 1/2007 | Okada et al. ................. 358/1.13 |
| 2007/0091360 | A1 | 4/2007 | Iizuka |
| 2007/0146768 | A1 | 6/2007 | Isoda |
| 2008/0037052 | A1 | 2/2008 | Nishiguchi |
| 2008/0114922 | A1 | 5/2008 | Chou et al. |
| 2009/0244594 | A1 | 10/2009 | Nuggehalli |
| 2009/0244595 | A1 | 10/2009 | Kim |
| 2009/0244596 | A1 | 10/2009 | Katano |

FOREIGN PATENT DOCUMENTS

| | | | |
|---|---|---|---|
| EP | 1 143 695 | | 10/2001 |
| EP | 1 229 724 | | 8/2002 |
| EP | 1 229 724 | A2 | 8/2002 |
| EP | 1229724 | | 8/2002 |
| EP | 1229724 | A2 | 8/2002 |
| EP | 1 367 814 | | 12/2003 |
| EP | 1 465 052 | A2 | 10/2004 |
| EP | 1 511 287 | | 3/2005 |
| EP | 1 621 994 | | 2/2006 |
| EP | 1621994 | A1 | 2/2006 |
| JP | 2001125982 | A | 5/2001 |
| JP | 2001217948 | A | 8/2001 |
| JP | 2002007095 | A | 1/2002 |
| WO | WO 00/68817 | | 11/2000 |

OTHER PUBLICATIONS

Claims, European patent application 07250426.9-1245, 2 pages.
European Patent Office, "European Search Report", European patent application 07250426.9-1245, dated Jun. 12, 2008, 19 pages.
European Patent Office, "European Search Report", EP application No. EP 07252112, dated Mar. 1, 2010, 6 pages.
European Patent Office, "European Search Report", application No. EP 09156641, dated Jul. 2, 2009, 8 pages.
European Patent Office, "European Search Report", application No. EP 09 15 6660, dated Jul. 6, 2009, 7 pages.
U.S. Appl. No. 11/788,517, filed Apr. 20, 2007, Notice of Allowance, Mailing Date Oct. 3, 2011.

* cited by examiner

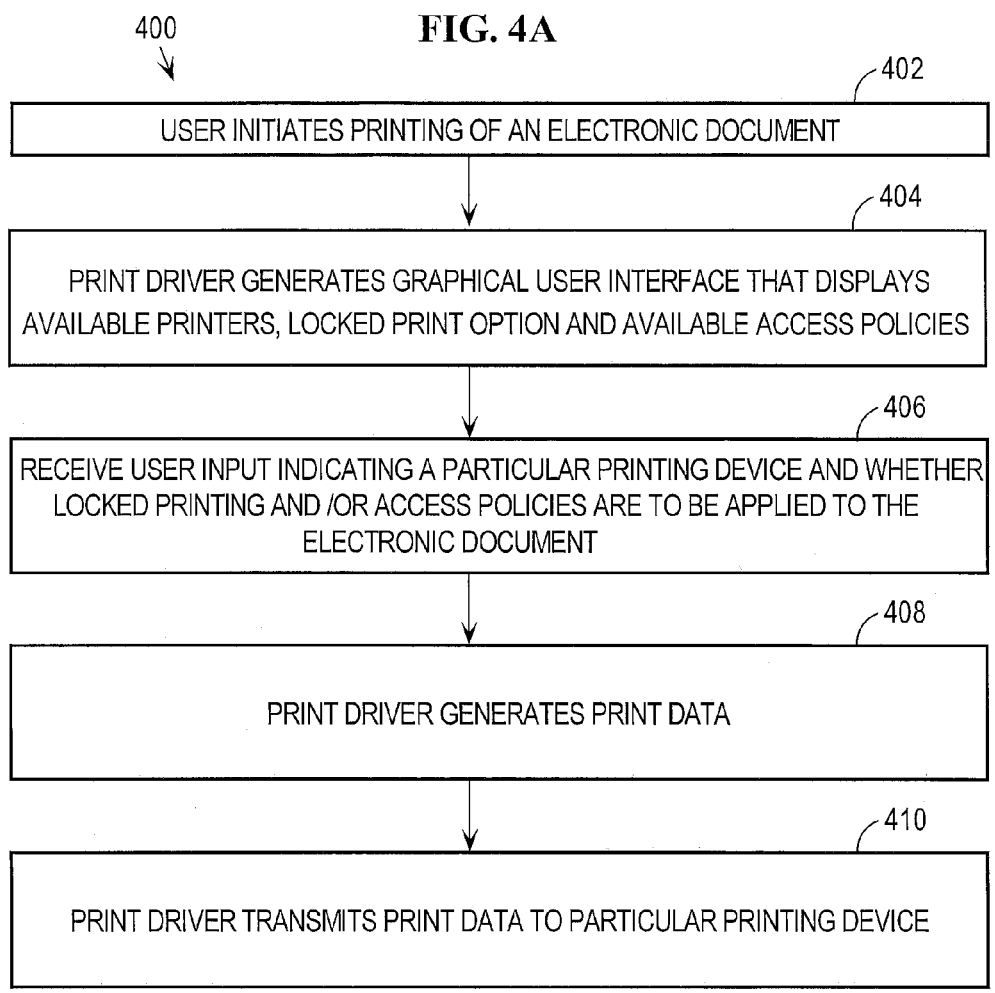

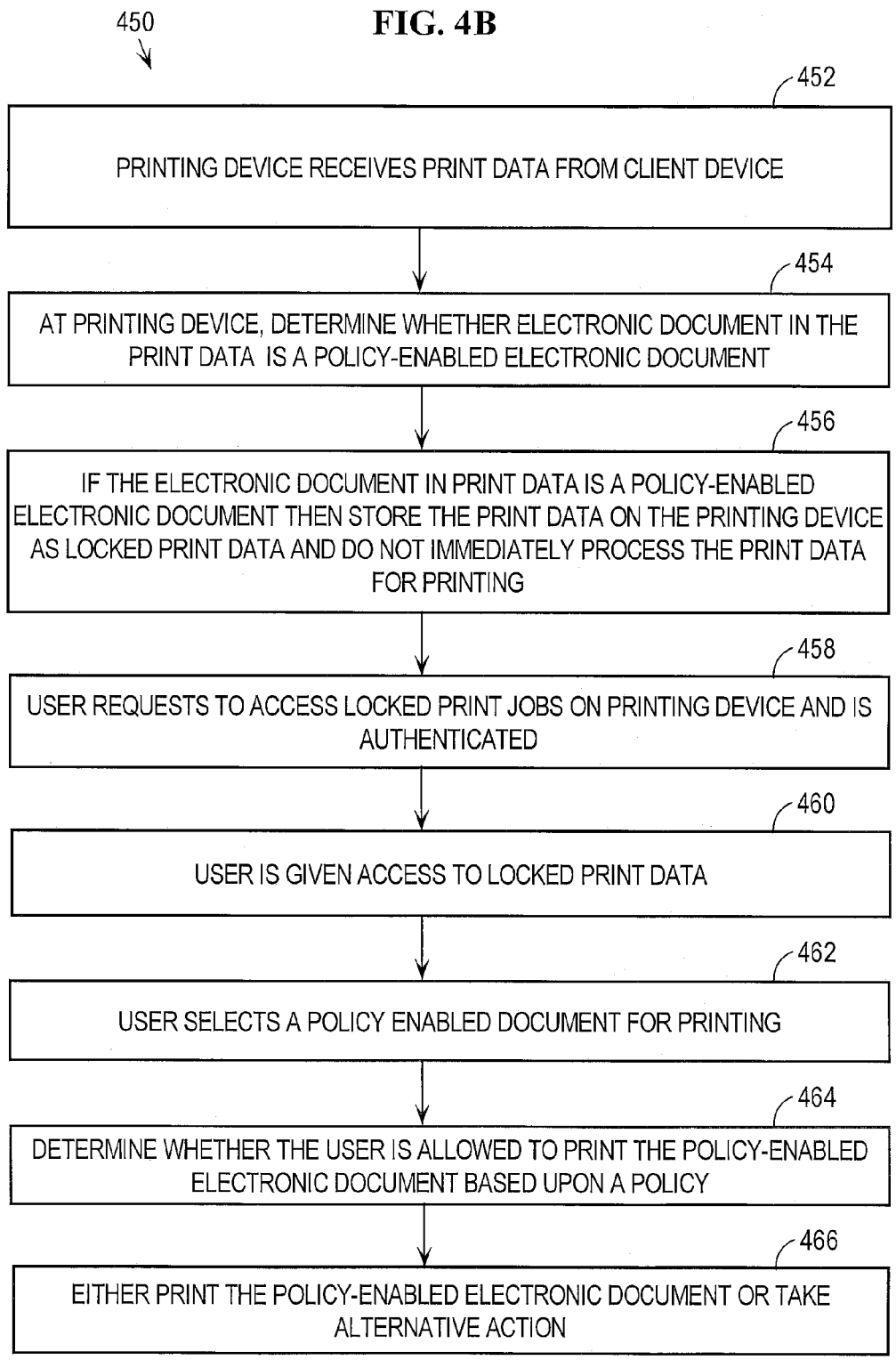

FIG. 6A

```
Select your User ID from Local Jobs
Local Jobs                                    Locked Print
All | 0-9 | AB | CD | EF | GH | IJK | LMN | OPQ | RST | UVW | XYZ
jay  kewei  seiichi  test
                                                 1/1
                                              Previous
                                              Next
                           System Status  Job List   JUL 23,2007
                                                     1:35PM
```

FIG. 6B

```
Select your User ID from Local User List
Local Jobs \ Remote Jobs                       Locked Print
All | 0-9 | AB | CD | EF | GH | IJK | LMN | OPQ | RST | UVW | XYZ
    (!) Enter the password with the number keys, then press [OK].
fly     User ID: fly
        Password:  ****    Clear              1/1
Cancel                                 OK    revious
                                              Next
                           System Status  Job List   MAR 7,2007
                                                     1:54PM
```

FIG. 6C

```
              | Job Name        | Page | Date/Time            |
              | X | paul - xl_auto.doc | 0001 | Fri Sep 15 11:18:31 2006 | Exit
              | X | paul Seauto       | 0001 | Fri Sep 15 11:18:32 2006 |
User ID:      | X | paul ps_auto.doc  | 0001 | Fri Sep 15 11:18:33 2006 |
paul
Total: 3 jobs
1/1                                                                      Print
Previous                                                                 Delete
Next                                                                     Deselect All
                           System Status  Job List   SEP 15,2006
                                                     11:52AM
```

PRINT DRIVER FOR PRINTING POLICY-ENABLED ELECTRONIC DOCUMENTS USING LOCKED PRINTING

RELATED APPLICATION DATA

This application is related to U.S. patent application Ser. No. 12/059,836 entitled APPROACH FOR PRINTING POLICY-ENABLED ELECTRONIC DOCUMENTS USING LOCKED PRINTING, filed Mar. 31, 2008; U.S. patent application Ser. No. 12/059,916 entitled APPROACH FOR PROCESSING PRINT DATA USING PASSWORD CONTROL DATA, filed Mar. 31, 2008; U.S. patent application Ser. No. 12/059,986 entitled APPROACH FOR PRINTING POLICY-ENABLED ELECTRONIC DOCUMENTS USING LOCKED PRINTING AND A SHARED MEMORY DATA STRUCTURE, filed Mar. 31, 2008; U.S. patent application Ser. No. 11/439,796 entitled REMOTE STORED PRINT JOB RETRIEVAL, filed May 23, 2006; U.S. patent application Ser. No. 11/411,248 entitled APPROACH FOR IMPLEMENTING LOCKED PRINTING WITH REMOTE UNLOCK ON PRINTING DEVICES, filed Apr. 25, 2006; U.S. patent application Ser. No. 11/346,479 now issued as U.S. Pat. No. 7,249,900, entitled APPROACH FOR IMPLEMENTING LOCKED PRINTING ON PRINTING DEVICES, filed Feb. 1, 2006; U.S. patent application Ser. No. 11/656,592 entitled FAULT TOLERANT PRINTING SYSTEM, filed Jan. 22, 2007; U.S. patent application Ser. No. 11/788,517 entitled APPROACH FOR IMPLEMENTING LOCKED PRINTING WITH UNLOCK VIA A KEYPAD, filed Apr. 20,2007; and U.S. patent application Ser. No. 11/880,359 entitled APPROACH FOR PROCESSING PRINT JOBS ON PRINTING DEVICES, filed Jul. 20, 2007, the contents all of which are incorporated by reference in their entirety for all purposes as if fully set forth herein.

FIELD OF THE INVENTION

This invention relates generally to printing of electronic documents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The proliferation of communications networks, and in particular the Internet, has raised growing concerns about the security of information transmitted over networks. Numerous protection schemes have been implemented to secure electronic documents transmitted over the Internet, ranging from simple passwords to strong encryption. Policy-based solutions have also been developed that allow business organizations to control access to electronic documents. An electronic document for which the access thereto is controlled using a policy is referred to hereinafter as "policy-enabled document." A policy defines the conditions under which a user is granted access to an electronic document. For example, a policy might specify that particular users are allowed access to the electronic document. Alternatively, the policy might specify that all users on a particular project, or all users at a specified level or higher within a business organization, may access the electronic document.

When a user attempts to open the electronic document through an application, the application prompts the user for user credentials, typically in the form of a user ID and password. The user credentials are authenticated to verify the user. Then, the credentials are provided to a policy server along with data that identifies the electronic document that the user is attempting to access. The policy server retrieves a policy associated with the electronic document and then determines, based upon the policy, whether the user should be allowed to access the electronic document. The policy server returns data to the application that indicates whether the user is allowed to access the electronic document. The application selectively allows the user access to the electronic document based upon the data provided by the policy server.

One of the main benefits of the policy-based approach is that the access rights for any number of electronic documents may be changed by changing single policy, without having to change each of the electronic documents. For example, a business organization may change a single policy for a product that may affect access to a hundreds or even thousands of electronic documents.

One of the limitations of using policies to control access to electronic documents is that once a user has been granted access to an electronic document, the electronic document may be distributed to and accessed by other users, either in electronic or printed form. For example, once a user has been granted access to a policy-enabled electronic document and printed the document, third parties may access the printed document, with or without the consent of the user. Thus, policy-based solutions do not provide control over electronic documents once they have been printed, which can be a significant problem for documents containing sensitive information. Based on the foregoing, there is a need for an approach for controlling access to electronic documents that does not suffer from limitations of prior approaches.

SUMMARY

An approach is provided for printing policy-enabled electronic documents using locked printing. A client device includes a user interface, an application program and a print driver. The user interface is configured to display information to users and receive user input from the users. The application program allows a user to generate an electronic document. The print driver corresponds to a particular printing device and is configured to cause a graphical user interface to be displayed on the user interface. The graphical user interface allows a user to specify one or more access policies to be applied to the electronic document. The print driver is also configured to generate print data that includes a plurality of print commands which, when processed by the particular printing device, cause a printed version of the electronic document to be generated at the printing device. The print data includes data that indicates the one or more attributes of the one or more access policies that are to be applied to the electronic document.

According to one embodiment of the invention, a client device includes a user interface, an application program and a print driver. The user interface is configured to display information to users and receive user input from the users. The application program allows a user to generate an electronic document. The print driver corresponds to a particular printing device and is configured to cause a graphical user interface to be displayed on the user interface, wherein the graphical user interface allows a user to specify one or more attributes of one or more access policies that are to be applied to the electronic document. The print driver is also configured to generate print data that includes a plurality of print commands which, when processed by the particular printing device, cause a printed version of the electronic document to be generated at the printing device. If the one or more access policies are specified for the electronic document, then the print data includes data that indicates the one or more attributes of the one or more access policies that are to be applied to the electronic document. The print driver is further configured to cause the print data to be transmitted to the printing device.

BRIEF DESCRIPTION OF THE DRAWINGS

In the figures of the accompanying drawings like reference numerals refer to similar elements.

FIG. 4A is a flow diagram that depicts an approach for printing a policy-enabled electronic document using locked printing from the client-side perspective.

FIG. 4B is a flow diagram that depicts an approach for printing a policy-enabled electronic document using locked printing from the printing device perspective.

FIG. 6A is an example graphical user interface screen that queries a user for a user selection.

FIG. 6B is an example graphical user interface screen that queries a user for a password associated with a selected user.

FIG. 6C is an example graphical user interface screen that presents a list of locked print data available to this user for processing.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:
  I. OVERVIEW
  II. ARCHITECTURE FOR PRINTING POLICY-ENABLED ELECTRONIC DOCUMENTS USING LOCKED PRINTING
  III. PRINTING A POLICY-ENABLED ELECTRONIC DOCUMENT USING LOCKED PRINTING—CLIENT SIDE PERSPECTIVE
  IV. PRINTING A POLICY-ENABLED ELECTRONIC DOCUMENT USING LOCKED PRINTING—PRINTING DEVICE PERSPECTIVE
  V. IMPLEMENTATION MECHANISMS I. Overview An approach is provided for printing policy-enabled electronic documents using locked printing. A client device includes a user interface, an application program and a print driver. The user interface is configured to display information to users and receive user input from the users. The application program allows a user to generate an electronic document. The print driver corresponds to a particular printing device and is configured to cause a graphical user interface to be displayed on the user interface. The graphical user interface allows a user to specify one or more access policies to be applied to the electronic document. The print driver is also configured to generate print data that includes a plurality of print commands which, when processed by the particular printing device, cause a printed version of the electronic document to be generated at the printing device. The print data includes data that indicates the one or more attributes of the one or more access policies that are to be applied to the electronic document.

This approach allows policy-enabled electronic documents to be printed remotely but manages the print data on printing devices as locked print data to provide improved control over the print data. The use of locked printing for policy-enabled electronic documents ensures that users are present at a printing device when the policy-enabled documents are printed. Users' access rights may be changed dynamically, e.g., revoked after an electronic document has been sent to a printing device, by changing the access policies. The use of access policies with a document policy management system may also allow an audit trail to be maintained for each electronic document. Furthermore, the approach is compatible with existing locked printing and policy-based solutions for controlling access to electronic documents.

Figure 1:
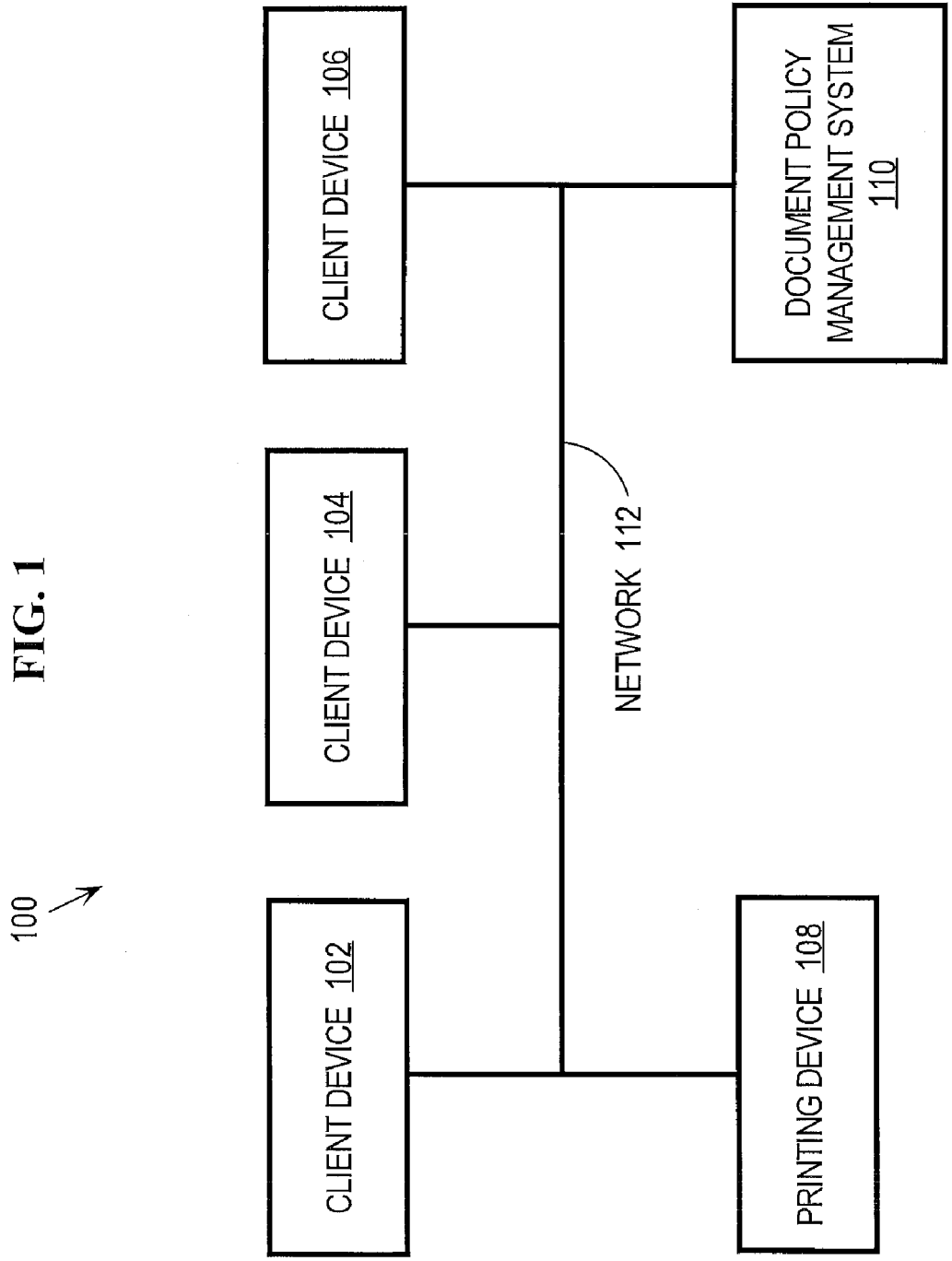
FIG. 1 is a block diagram that depicts an arrangement for printing policy-enabled electronic documents using locked printing.

II. Architecture for Printing Policy-Enabled Electronic Documents Using Locked Printing FIG. 1 is a block diagram that depicts an arrangement 100 for printing policy-enabled electronic documents using locked printing. Arrangement 100 includes client devices 102, 104, 106, a printing device 108 and a document policy management system 110 communicatively coupled via network 112. Client devices 102, 104, 106 may be implemented by any type of client devices. Example implementations of client devices 102, 104, 106 include, without limitation, workstations, personal computers, laptop computers, personal digital assistants (PDAs), cellular telephony devices and any type of mobile devices. In the example arrangement depicted in FIG. 1, it is assumed that client devices 102, 104, 106 are configured with an application program and a print driver that corresponds to printing device 108. Example application programs include, without limitation, a Word processor, a spreadsheet program, an email client and financial software.

The print driver on each client device 102, 104, 106 is configured to process data from the application program and generate print data that is provided to printing device 108 for processing. The print data includes a plurality of print commands which, when processed by the printing device 108, cause a printed version of the electronic document to be generated at the printing device 108. Thus, the application program and the print driver on each client device 102, 104, 106 operate together to generate and provide print data to printing device 108.

The print driver on each client device 102, 104, 106 is also configured to generate a graphical user interface that allows a user to specify attributes of one or more access policies to be applied to an electronic document. Example attributes include, without limitation, a name of an access policy and a location of an access policy. The access policies define what users may access certain electronic documents. For example, an access policy may define that users having certain characteristics, e.g., being at a certain level or being a member of a group or project within an organization, may access an electronic document. The print drivers obtain document policy data from the document policy management system 110 and present the information on the graphical user interface and allow a user to select a particular policy to be applied to an electronic document. As described in more detail hereinafter, the print drivers then include in print data, data that indicates the one or more attributes of the access policies selected by the user. The graphical user interface also allows a user to specify that locked printing is to be used to print a particular electronic document. Client devices 102, 104, 106 may be configured with other mechanisms, processes and functionality, depending upon a particular implementation.

Printing device 108 may be implemented by any type of device that is capable of processing print data and generating printed versions of electronic documents reflected in the print data. For example, printing device 108 may be a multi-function peripheral (MFP) that includes any combination of printing, copying, facsimile and scanning capability, etc. Document policy management system 110 is an entity that stores and manages access policies and is capable of determining, based upon a policy, whether a user is authorized to print an electronic document. For example, given a user ID, password and identification of an electronic document, document policy management system 110 is able to determine whether, based upon a policy, the user is authorized to print the electronic document.

Network 112 may be implemented by any type of medium and/or mechanism (wired or wireless) that facilitates the exchange of information between the client devices 102, 104, 106 and printing device 108. Furthermore, network 112 may use any type of communications protocol and may be secured or unsecured, depending upon the requirements of a particular application. Note that although arrangement 100 includes a single printing device 108, the approach is applicable to any number of printing devices. Also, although the document policy management system 110 is depicted in FIG. 1 as a separate network entity, the functionality of the document policy management system 110 may be co-resident on other devices, such as client devices 102, 104, 106 and printing device 108.

Figure 2:
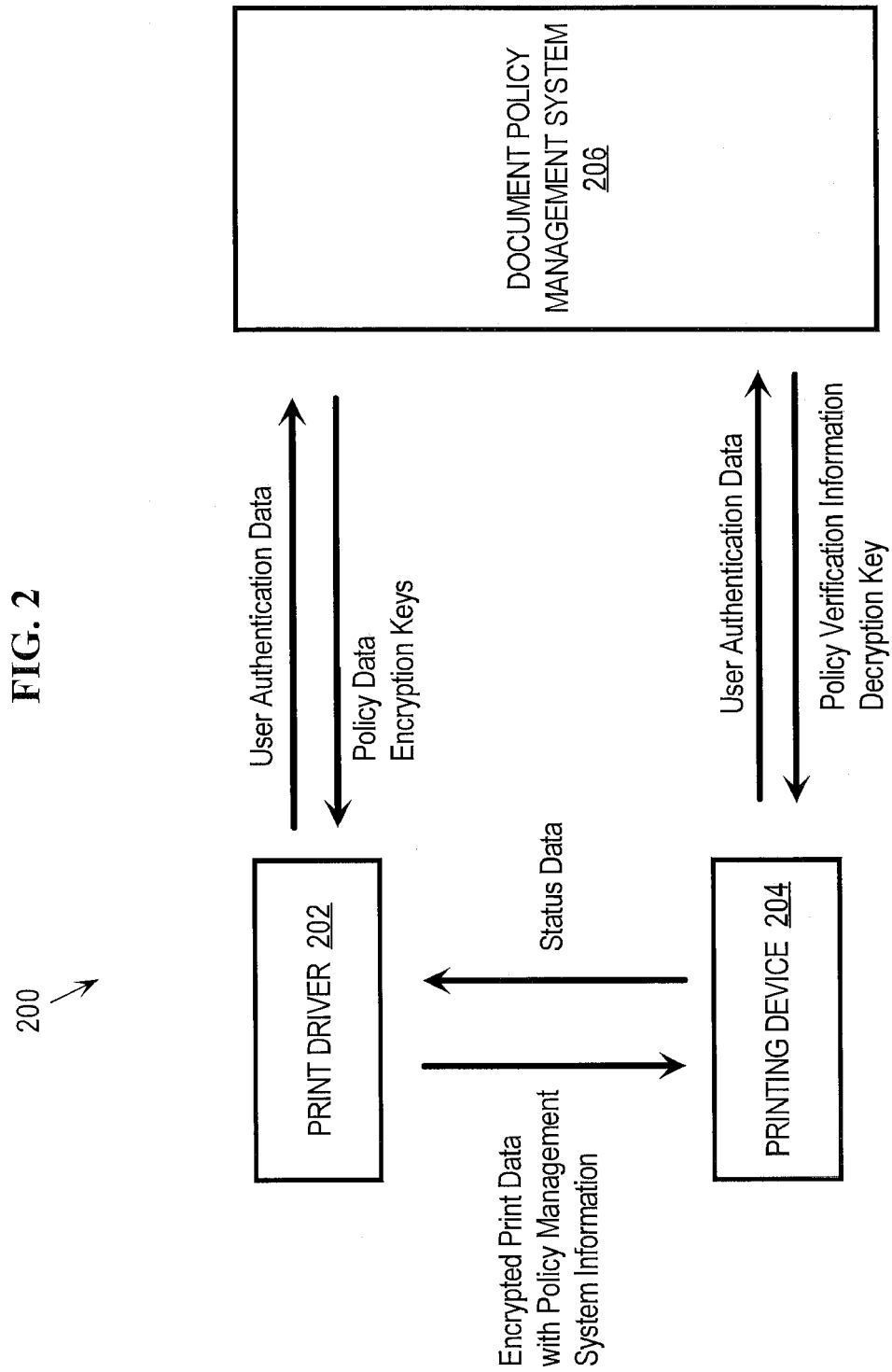
FIG. 2 is a block diagram that depicts functional relationships between a print driver configured in accordance with an embodiment of the invention, a printing device and a document policy management system.

FIG. 2 is a block diagram 200 that depicts functional relationships between a print driver 202 configured in accordance with an embodiment of the invention, a printing device 204 and a document policy management system 206. For purposes of explanation, other elements, such as a client device, are not depicted in FIG. 2.

Print driver 202 provides user authentication data to document policy management system 206 and receives policy data and one or more encryption keys from the document policy management system 206. Print driver 202 generates print data and encrypts at least a portion of the print data using the one or more encryption keys received from the document policy management system 206. Print driver 202 provides the encrypted print data and policy management system information to printing device 204. The policy management system information may include, for example, the name and/or location of document policy management system 206. In some situations print driver 202 may receive status data from printing device 204. The status data may indicate, for example, the status of the processing of print data sent to printing device 204.

Printing device 204 stores the encrypted print data as locked print data. Printing device 204 provides user authentication data to document policy management system 206 and receives, from document policy management system 206, policy verification information and one or more decryption keys. The policy verification information generally indicates, based upon one or more applicable access policies, whether a user associated with the user authentication data is authorized to access a particular electronic document. The decryption keys are used by the printing device 204 to decrypt the print data stored on printing device 204.

Figure 3:
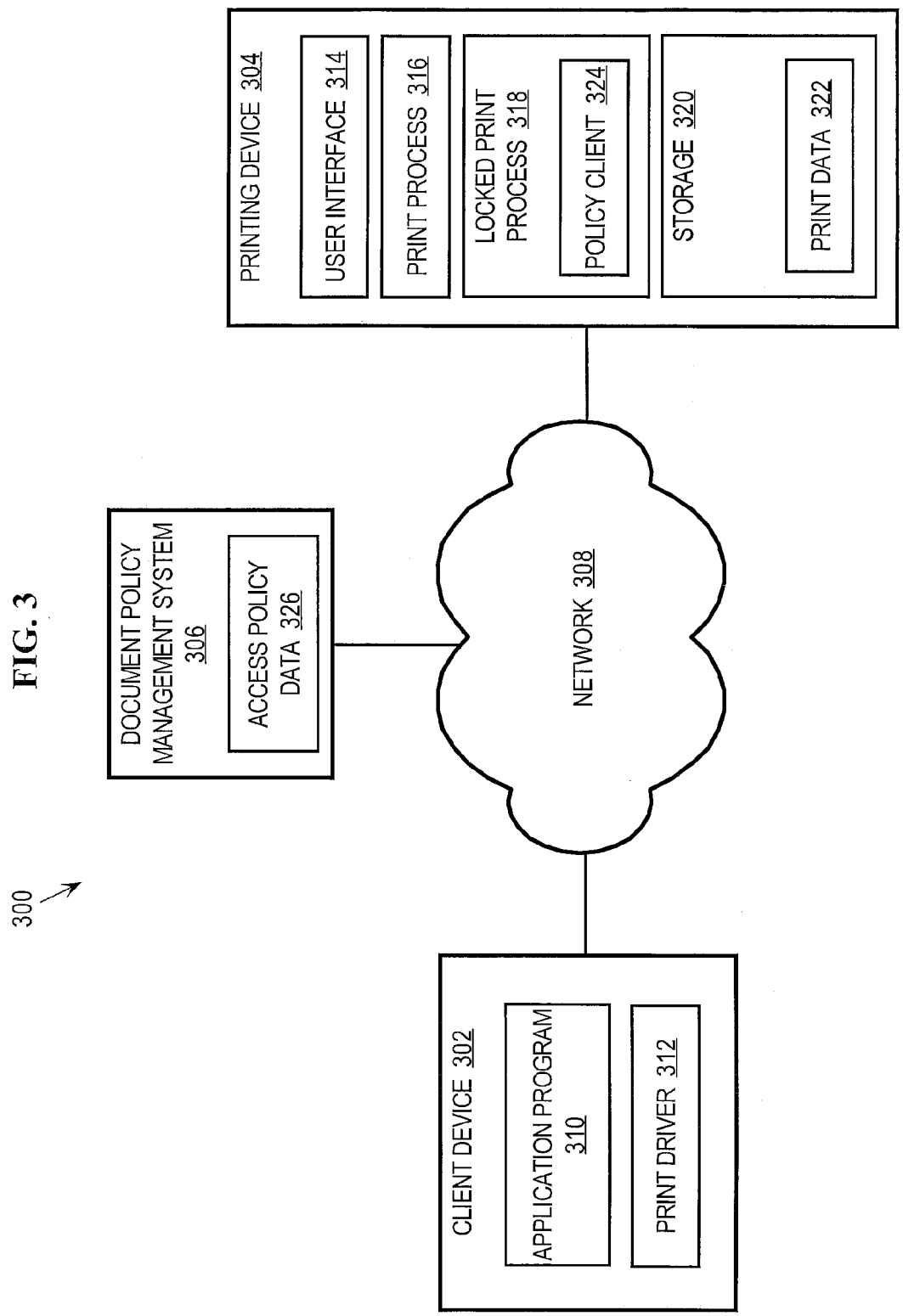
FIG. 3 is a block diagram of an arrangement for printing policy-enabled electronic documents using locked printing according to one embodiment of the invention.

FIG. 3 is a block diagram of an arrangement 300 for printing policy-enabled electronic documents using locked printing according to one embodiment of the invention. Arrangement 300 includes a client device 302, a printing device 304 and a document policy management system 306 that are communicatively coupled via a network 308. Client device 302 includes an application program 310 and a print driver 312.

Printing device 304 is configured with a user interface 314, a print process 316, a locked print process 318 and storage 320 that stores print data 322. User interface 314 may be any mechanism and/or medium that provides for the exchange of information between a user and printing device 304. Examples of user interface 314 include, without limitation, a control panel with a display and keypad or keyboard, a cathode ray tube (CRT), a liquid crystal display (LCD), a keyboard, touchpad, mouse, trackball, a microphone and speakers, and any combination thereof. Printing device 304 may be configured to display information on user interface 116 in any number of languages, depending upon a particular implementation. As with conventional printing devices, the user interface 314 on printing device 304 may provide limited capability to easily enter alphanumeric strings.

Print process 316 may be implemented by one or more processes for processing print data received from client device 302 and for generating a printed version of an electronic document reflected in the print data. Print process 316 and locked print process 318 may be implemented as resident processes on printing device 304. Alternatively, print process 316 and locked print process 318 may be made available to printing device 304 on a removable media or may be implemented at a remote location with respect to printing device 304. Locked print process may be implemented by one or more processes for providing locked print services on printing device 304. Locked print process 318 may include a policy client 324 that interacts with the document policy management system 306, as described in more detail hereinafter. The document policy management system 306 includes access policy data 326 that defines one or more access policies that may be applied to electronic documents to control user access to the electronic documents on printing device 304.

Storage 320 may be implemented by any type of storage, including volatile storage, non-volatile storage, or any combination of volatile and non-volatile storage. Examples of storage 320 include, without limitation, random access memory (RAM) and one or more disks. User interface 314, print process 316, locked print process 318 and storage 320 may be implemented in hardware, software, or any combination of hardware or software, depending upon a particular implementation.

III. Printing a Policy-Enabled Electronic Document Using Locked Printing—Client Side Perspective FIG. 4A is a flow diagram 400 that depicts an approach for printing a policy-enabled electronic document using locked printing from the client-side perspective. In step 402, a user initiates printing of an electronic document. For example, a user may create a word processing document using application program 310 (in the context of application program 310 being a word processor) and initiate printing of the electronic document.

In step 404, the print driver 312 causes a printing graphical user interface to be displayed that indicates the available printers and one or more access policies that may be applied to the electronic document. The printing graphical user interface may also display other printing options, such as a locked print option. The structure and arrangement of the graphical user interface may vary depending upon a particular implementation and the invention is not limited to any particular graphical user interface. For example, the selection of locked printing may be provided via a radio button or a checkbox. The available access policies may be provided in a list on the printing graphical user interface. The print driver 312 communicates with the document policy management system 306 to obtain the current access policy data 326 that specifies the available access policies. The access policies control whether a particular user, at a particular point in time, is authorized to print a locked print document stored on a printing device.

In step 406, the print driver 312 detects and/or receives user input via the printing graphical user interface that indicates the user's selection of a particular printing device and one or more access policies that are to be applied to the electronic document. For example, a list of access policies may be presented to the user on the graphical user interface and the user selects one or more of the access policies to be applied to the electronic document.

In step 408, the print driver generates print data that includes a set of print commands which, when processed by the particular printing device, cause the electronic document to be printed at the particular printing device. The print data also includes information that indicates the one or more attributes of one or more access policies to be applied to the electronic document. For example, the print data may include an APSPASSWORD command indicating that the electronic document contained in the print data is a policy-enabled electronic document. As another example, the print data may include a PDFPASSWORD command indicating that the electronic document contained in the print data is a password protected PDF document. The following Printer Job Language (PJL) headers are examples of data that may be included with the print data to indicate that access policies are applied to the electronic data:

```
@PJL POLICYSERVERURL="https://..../policyservices"
@PJL POLICYSERVERUSERID="..."
@PJL POLICYSSERVERPASSWORD=..... [This information may be encrypted]
```

In this example, the PJL headers indicate the URL of a policy server, a policy server user ID and a policy server password. The policy server manages the access policies used to control access to the electronic document. The policy server user ID and policy server password are used by the policy server to authenticate the user. In addition to the foregoing example PJL headers, other PJL headers may be included to specify the particular access policies selected by a user. Although embodiments of the invention are described herein in the context of a policy server, the invention is not limited to server implementations and any type of data repository or managed storage may be used.

As previously described herein, the approach may be used in conjunction with locked printing. Therefore, in situations where a user designated locked printing, the print data also includes data that indicates that locked printing has been specified for the electronic document.

The data indicating that an electronic document is a policy-enabled electronic document, as well as other information such as whether locked printing is to be used, may be contained in a header portion of the print data, in the body portion of the print data, or any combination of a header portion and body portion of the print data. For example, in some implementations, the application that generates the print data in conjunction with a print driver may create a header that is appended to the print data and the header contains one or more commands that indicate that the electronic document contained in the print data is a policy-enabled electronic document. According to one embodiment of the invention, the presence in the print data of an APSPASSWORD command indicates that the electronic document is a policy-enabled electronic document.

According to one embodiment of the invention, print driver 312 encrypts at least a portion of or all of the print data using an encryption key provided by the document policy management system 306. For example, in response to receiving user input indicating that one or more access policies are to be applied to the electronic document, print driver 312 retrieves one or more encryption keys from document policy management system 306 and uses the one or more encryption keys to encrypt at least a portion of the print data.

In step 410, the print driver 312 causes the print data, which may be partially or completely encrypted, to be transmitted to the particular printing device selected by the user.

IV. Printing a Policy-Enabled Electronic Document Using Locked Printing—Printing Device Perspective FIG. 4B is a flow diagram 450 that depicts an approach for printing a policy-enabled electronic document using locked printing from the printing device perspective. In step 452, the printing device 304 receives the print data from the client device 302.

In step 454, at the printing device, a determination is made whether the electronic document in the print data is a policy-enabled electronic document. According to one embodiment of the invention, locked print process 318 examines the print data to determine whether the electronic document reflected in the print data is a policy-enabled electronic document. This may be determined, for example, by the presence of one or more commands or codes in the print data that indicate that the electronic document is a policy-enabled electronic document. As previously described herein, the print data may include PJL headers that indicate that one or more access policies are to be applied to the electronic document.

In step 456, if the electronic document reflected in the print data is a policy-enabled electronic document, then the print data is stored on printing device 304 and not immediately processed for printing. According to one embodiment of the invention, the print data 322 is stored on storage 320 and managed as locked print data. If the electronic document reflected in the print data is not a policy-enabled electronic document, the print data 322 is processed normally.

In step 458, a user requests access to locked print jobs stored on the printing device and is authenticated. For example, a user may select a locked print jobs button or icon on user interface 314 to request access to locked print jobs stored on printing device 304. Then the user is queried for user credential data, such as a user ID and password. The user credential data is authenticated. For example, locked print process 318 may be configured to authenticate the user credential data based upon data stored locally on storage 320. This may include, for example, comparing a user ID and password pair specified in the user credential data to a list of verified user ID/password pairs. As another example, a one-way hash function may be used to generate a result based upon the user ID/password pair specified in the authentication data. The result may then be compared to a list of verified results. These are just two examples of how authentication of the user credential data may be performed and the invention is not limited to any particular authentication mechanism or approach.

Instead of authenticating the user credential data locally on printing device 304, the user credential data may be authenticated remotely with respect to printing device 304. For example, locked print process 318 may cause the user credential data to be transmitted to another location, e.g., an authentication server over network 308, for authentication. Locked print process 318 receives a return indication from the other location indicating whether the authentication data was verified.

If the user is successfully authenticated, then in step 460, the user is given access to the locked print data. For example, a list of locked print jobs associated with the user may be displayed on the user interface 314. Print data may be arranged on the user interface 314, for example, sorted by name or in an order in which the print data was received by printing device 304. The graphical user interface may also include one or more user interface objects that allow a user to select one or more print data to be processed at printing device 304 and one or more actions to be performed on those print data. For example, a user may select a user interface object associated with particular print data and then select a user interface object associated with a printing or deleting function to cause the particular print data to be processed accordingly. Users may be given different types of access to locked print data, depending upon a particular implementation. For example, users may be given access to only the print data that they generated. As another example, users may be given access to all locked print data associated with a logical group, such as a department, project, team, etc. As yet another example, an administrative user may be given access to all locked print data on a printing device so that the administrative user can properly manage the printing device. Access may be based upon the user credential data or other data stored on printing device 304.

In step 462, the user selects a policy-enabled electronic document to be processed and one or more actions to be performed on the print data. For purposes of explanation in the present example, it is presumed that the user selects a particular policy-enabled electronic document for printing, but other functionality is possible. For example, a user may request that a selected electronic document be forwarded to another printing device or deleted.

In step 464, a determination is made, based upon a policy, whether the user is allowed to print the policy-enabled electronic document. According to one embodiment of the invention, the locked print process 318 uses document policy management system 306 to make this determination. This may include, for example, the locked print process 318 transmitting to document policy management system 306 data that identifies the policy-enabled electronic document selected for printing by the user, along with at least part of the user credential information, for example a user ID. According to one embodiment of the invention, the policy client 324 provides the interaction with the document policy management system 306. The document policy management system 306 determines, based upon one or more policies, whether the user associated with the user ID is authorized to access the policy-enabled electronic document. The policy applied to make this determination may be specific to the printing of electronic documents, i.e., a print-specific policy, or may be a more general policy applied to any type of access to electronic documents. For example, a particular user may be authorized to have read-only access to a particular electronic document, but not print access.

Document policy management system 306 then returns to the locked print process 318 data that indicates whether the user associated with the user ID is authorized to access the policy-enabled electronic document. The locked print process 318 may also provide the full user credential data to document policy management system 306 to allow the document policy management system 306 to perform authentication in conjunction with authentication server 108.

Additional authentication may also be performed in conjunction with applying the policy. For example, when a user selects to print a policy-enabled electronic document, the user may be queried for additional user credential data, such as a user ID and password, that are used by the document policy management system 306 to provide additional authentication of the user. Although document policy management system 306 is depicted in the figures and described herein as being a separate entity from the printing device 304, the functionality provided by document policy management system 306 may be implemented locally on printing device 304. For example, printing device 304 may be configured with a policy process that makes the determination whether a user is authorized to access a particular policy-enabled electronic document.

According to one embodiment of the invention, in situations where a portion or all of print data is encrypted, then locked print process 318 decrypts the print data using one or more decryption keys provided by document policy management system 306. For example, the response from the document policy management system 306 indicating whether the user is authorized to access the electronic document may include one or more encryption keys, or references to one or more encryption keys, assuming the response indicates that the user is allowed to access the electronic document.

In step 466, the policy-enabled electronic document is printed if the user is allowed to print the policy-enabled document. This may include decrypting the policy-enabled electronic document using a decryption key received from document policy management system 306, or another source. Once successfully printed, the policy-enabled document may be deleted from storage 320 or retained for further processing. If the user is not allowed to print the policy-enabled document, then other action may be taken. For example, a message may be displayed on the user interface 314 of printing device 304 to inform the user that the user is not authorized to print the policy-enabled document.

Figure 5:
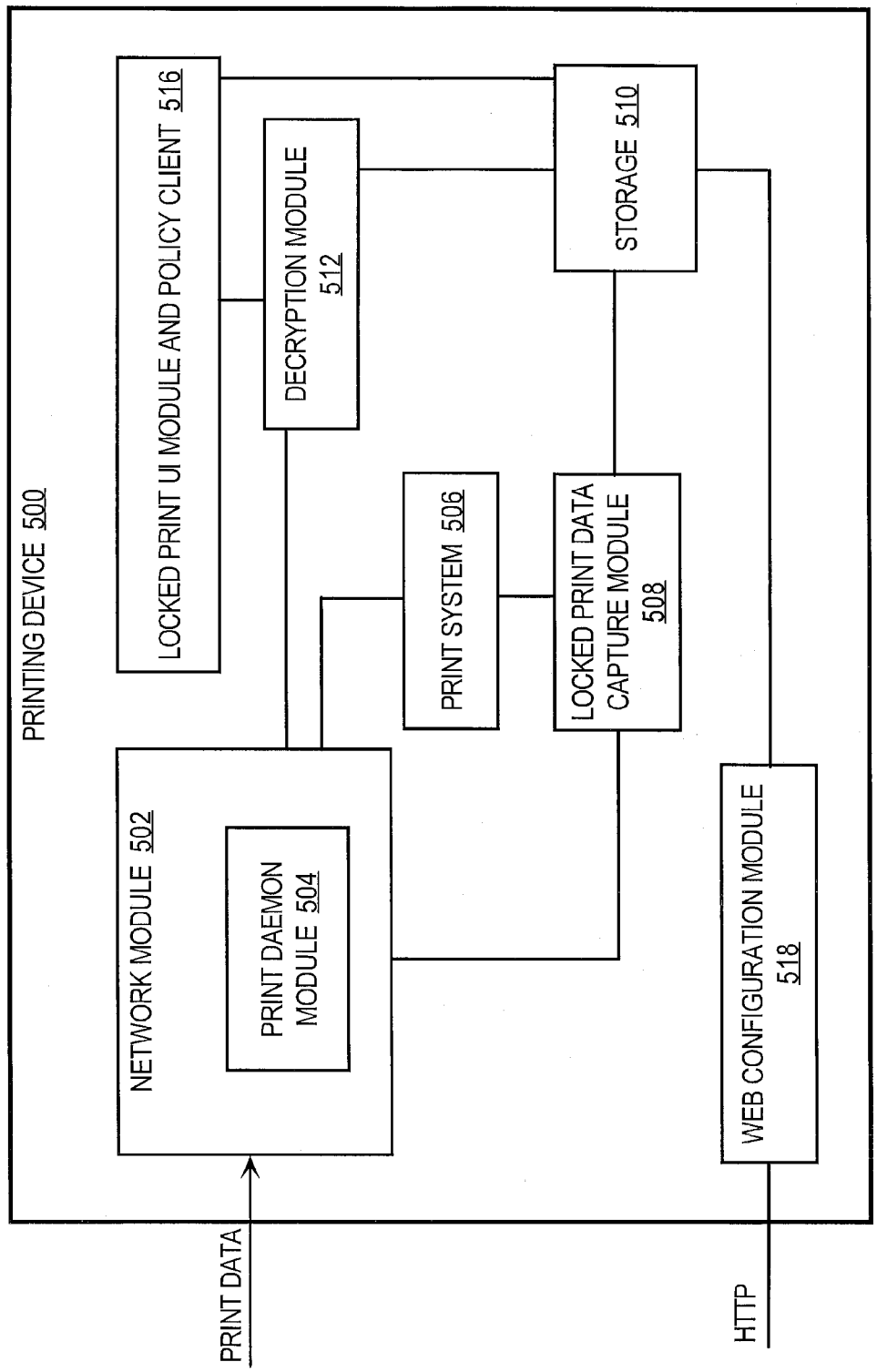
FIG. 5 is a block diagram that depicts an example implementation of a printing device configured to support printing of policy-enabled electronic documents using locked printing, according to one embodiment of the invention.

FIG. 5 is a block diagram that depicts an example implementation of a printing device 500 configured to support printing of policy-enabled electronic documents using locked printing, according to one embodiment of the invention. Printing device 500 includes a network module 502 for receiving print data over a communications link. Network module 502 includes a print daemon module 504. Received print data is processed by a print system 506 that may include, for example, PDL interpreters and/or rasterizing functionality. A locked print data capture module 508 processes print data and determines whether the print data is normal print data, locked print data, or policy-enabled print data. Locked print data capture module 508 may make this determination, for example, by examining the headers of received print data and determining whether the headers contain commands that indicate the type of print data. Locked print data capture module 508 is configured to cause both locked print data and policy-enabled print data to be stored on storage 510 as locked print data. Storage 510 may be any type of volatile storage, non-volatile storage, or combination of volatile and non-volatile storage. A decryption module 512 is configured to decrypt encrypted print data retrieved from storage 510.

A locked print UI module and policy client 516 provides UI functionality and also interacts as a policy server client with a policy server. The locked print UI module and policy client 516 also has a local connection to the print daemon module 504. The locked print UI module and policy client 516 performs numerous functions. For example, the locked print UI module and policy client 516 generates a graphical user interface that allows a user to be authenticated at printing device 500 and if the authentication is successful, provides a list of locked print data available to the user. The list includes locked print data and policy-enabled print data that is stored on storage 510 as locked print data.

For example, FIG. 6A is an example graphical user interface screen that queries a user for a user selection. In this example, a particular pre-specified user may be selected or a range of users may be selected. FIG. 6B is an example graphical user interface screen that queries a user for a password associated with a selected user. FIG. 6C is an example graphical user interface screen that presents a list of locked print data available to this user for processing. In response to detecting a user selection of particular print data, the particular print data is retrieved from storage 510, decrypted by decryption module 512 and printed by print daemon module 504. If the particular print data selected by the user is policy-enabled print data, then the locked print UI module and policy client 516 communicates with an entity that maintains access policies, such as document policy management system 306 or a policy server or policy repository, to determine whether the user is currently allowed to access the particular print data. This determination is made because an access policy may have changed since the particular print data was generated on the client device. In addition to checking one or more access policies, the user may be required to enter additional authentication data that is verified by the policy entity. If, based upon the one or more access policies, the user is allowed to access the particular print data, then the particular print data is retrieved from storage 510, decrypted by decryption module 512 and printed by print daemon module 504. Although the aforementioned functionality is depicted in FIG. 5 and described in the context of a single module, i.e., the locked print UI module and policy client 516, this is done for explanation purposes only and the functionality may be implemented on several different modules and/or processes, depending upon a particular implementation.

Figure 7:
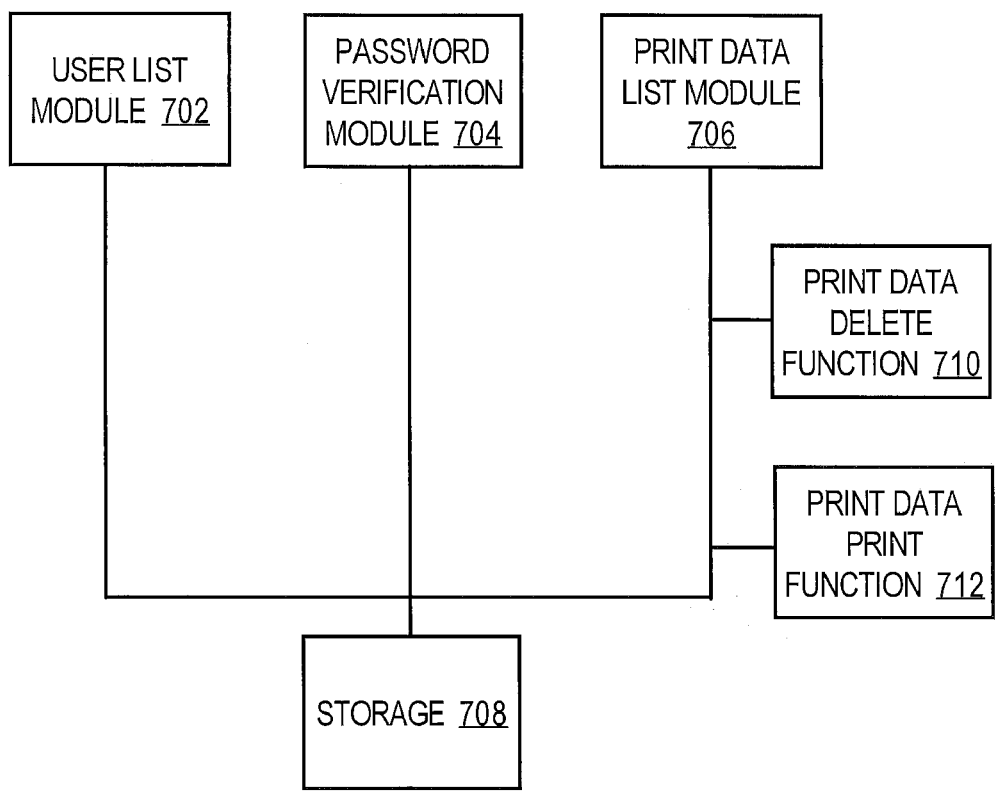
FIG. 7 is a block diagram that depicts an example implementation of a locked print and user interface functionality implemented by a locked print UI module and policy client.

FIG. 7 is a block diagram 700 that depicts an example implementation of the locked print and user interface functionality implemented by the locked print UI module and policy client 516. In this example, a user list module 702 is configured to generate and display a list of users. A password verification module 704 is configured to verify a password entered by a user with respect to a particular user. A print list module 706 is configured to generate and display a list of print data available to the user. User list module 702, password verification module 704 and print list module 706 are communicatively coupled to a storage 708 that stores user information, password information and print data information. The arrangement depicted in FIG. 7 also includes a print data delete function 710 and a print data print function 712, for deleting and printing print data, respectively.

Figure 8:
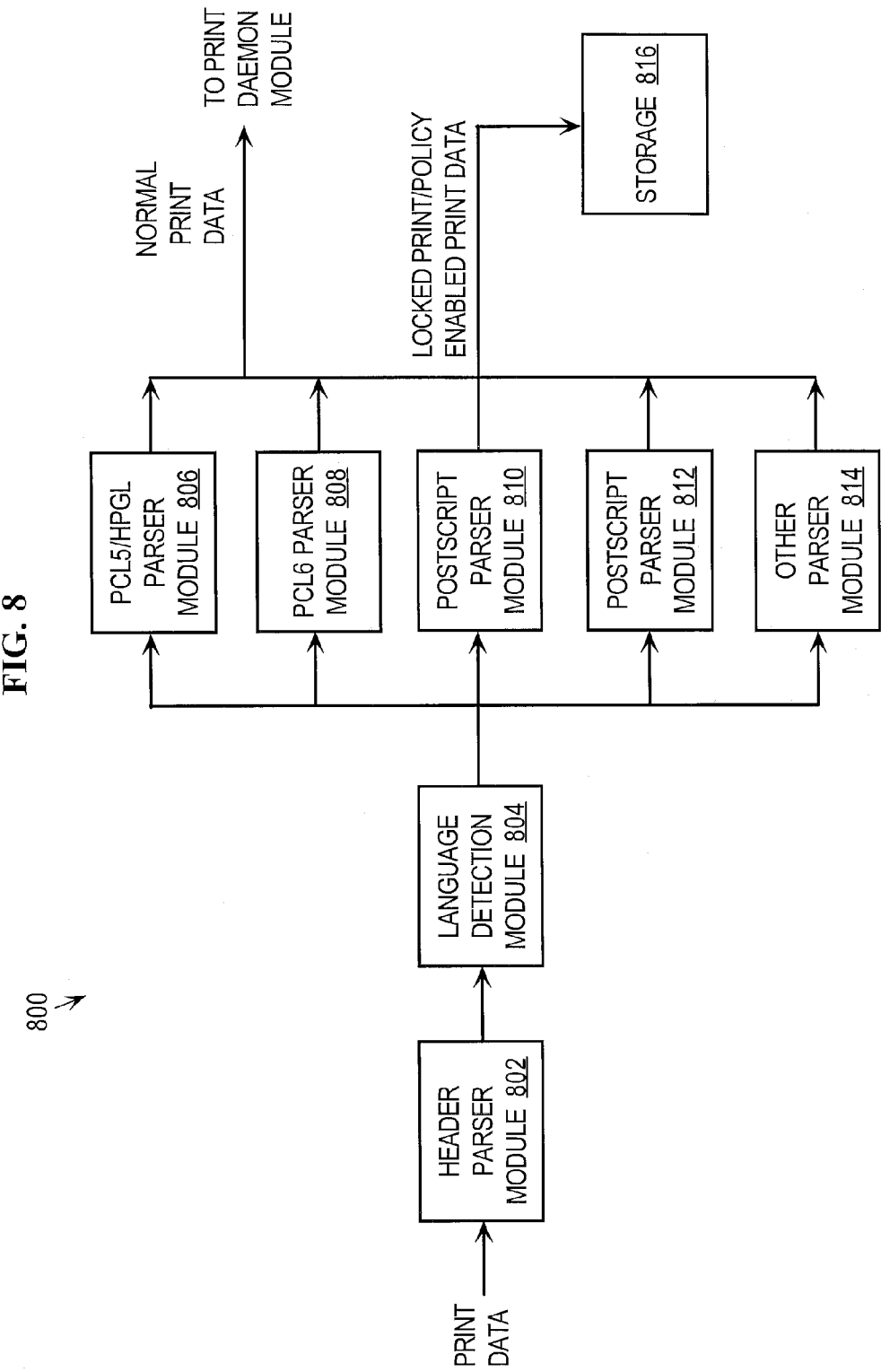
FIG. 8 is a block diagram that depicts example functional components of a locked print data capture module.

FIG. 8 is a block diagram 800 that depicts example functional components of locked print data capture module 508. In this example, print data is first processed by a header parser module 802 that examines header data contained in or received with the print data to determine whether the print data is normal print data, locked print data or policy-enabled print data. A language detection module 804 examines print commands contained in the print data to determine whether the print commands conform to a particular print language. In this example, parser modules are provided for different printer languages. For example, a PCL5/HPGL parser module 806, a PCL6 parser module 808, a postscript parser module 810, and an other parser module 812, that servers as a "catch all" or default parser module. Print data identified as normal print data is transmitted to print daemon module 504, while locked print and policy-enabled print data is transmitted to storage 814, where it is stored as locked print data, as previously described herein.

Figure 9:
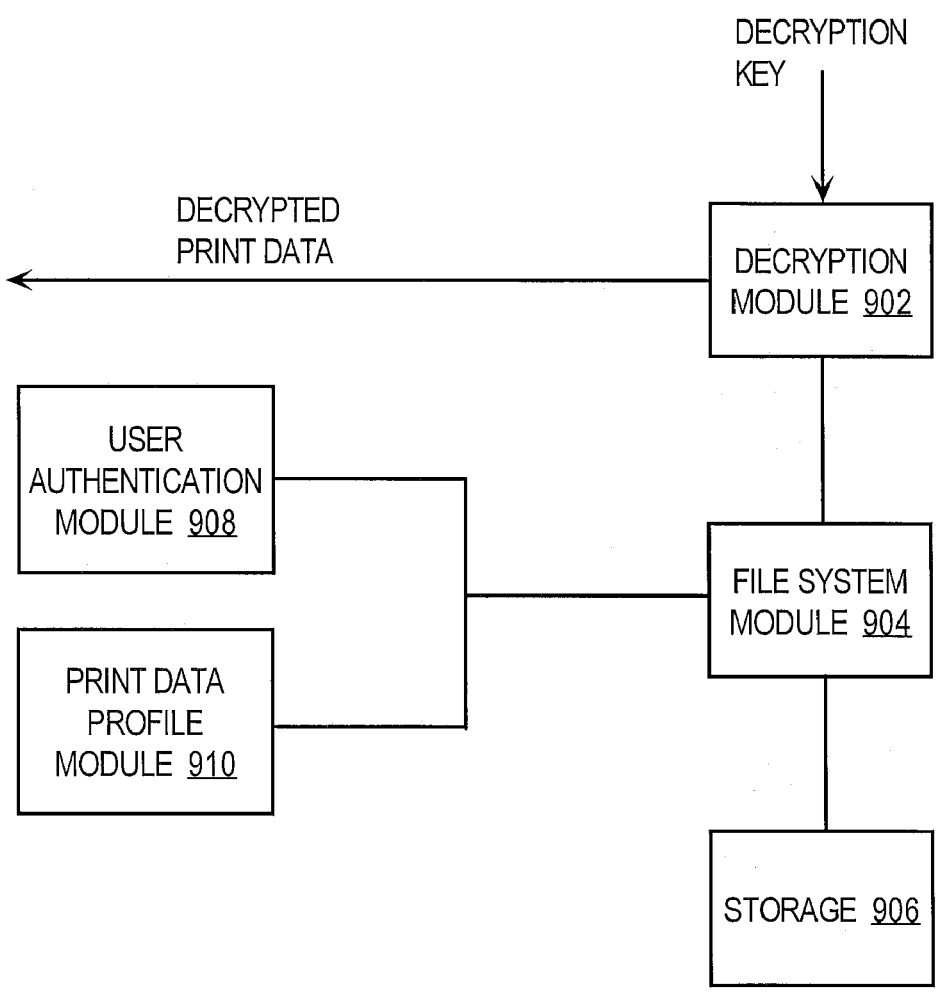
FIG. 9 is a block diagram that depicts example functional components of decryption module.

FIG. 9 is a block diagram that depicts example functional components of decryption module 512. In this example, a decryption module 902 receives a decryption key from locked print UI module and policy client 516. A file system module 914 retrieves encrypted print data from a storage 906, such as storage 510, and provides the encrypted print data to decryption module 902. File system module 904 interacts with a user authentication module 908 to authenticate users and with a print data profile module 910 to obtain information about print data stored on storage 906. FIG. 9 depicts a single example of the functional components of decryption module 512 and fewer or additional functional components may be used, depending upon a particular implementation.

A Web configuration module 518 allows a user, such as an administrator, to configure locked print functionality on printing device 500. Printing device 500 may include a wide variety of other components, modules and processes, depending upon a particular implementation, that are not included for purposes of brevity. For example, printing device 500 may include mechanisms and processes for generating printed versions of electronic documents that are not depicted in FIG. 5 for purposes of explanation.

IV. Implementation Mechanisms

Figure 10:
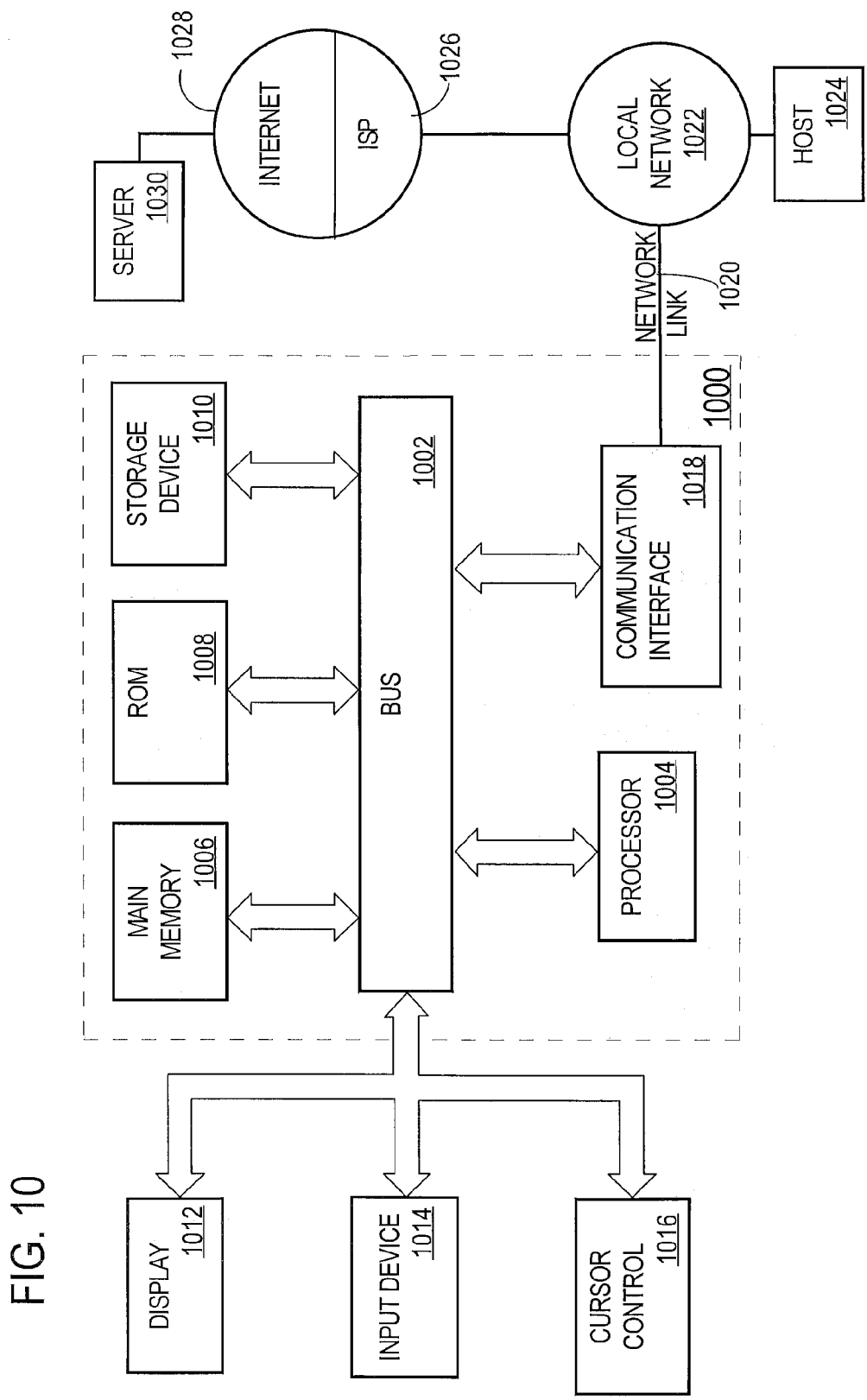
FIG. 10 is a block diagram of a computer system on which embodiments of the invention may be implemented.

The approach described herein for printing policy-enabled electronic documents using locked printing may be implemented on any type of computing platform or architecture. For purposes of explanation, FIG. 10 is a block diagram that depicts an example computer system 1000 upon which embodiments of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 1000, various computer-readable media are involved, for example, in providing instructions to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A client device comprising:
   a user interface configured to display information to users and receive user input from the users;
   an application program that allows a user to generate an electronic document; and
   a print driver that corresponds to a particular printing device and is configured to:
   cause a graphical user interface to be displayed on the user interface, wherein the graphical user interface allows a user to specify one or more attributes of one or more access policies that are to be used to control user access to the electronic document at the particular printing device,
   generate print data that includes a plurality of print commands which, when processed by the particular printing device, cause a printed version of the electronic document to be generated at the printing device, wherein if the one or more attributes of the one or more access policies are specified for the electronic document, then the print data includes data that indicates the one or more attributes of the one or more access policies that are to be used to control user access to the electronic document at the particular printing device, and cause the print data to be transmitted to the printing device.

2. The client device as recited in claim 1, wherein the one or more attributes of the one or more access policies include one or more of a name of an access policy, a location of an access policy and URL of a policy server that stores the one or more access policies.

3. The client device as recited in claim 1, wherein the print driver is further configured to generate the print commands in Print Job Language (PJL) format.

4. The client device as recited in claim 1, wherein the print driver is further configured to cause to be displayed on the graphical user interface a list of available access policies and one or more user graphical user interface objects that allow the user to select one or more of the available access policies.

5. The client device as recited in claim 1, wherein the print driver is further configured to:

retrieve an encryption key from a document policy management system, encrypt the print data using the encryption key, and cause the encrypted print data to be transmitted to the printing device.

6. The client device as recited in claim 1, wherein:

the graphical user interface allows a user to specify locked printing for the electronic document, wherein the specification of locked printing for the electronic document causes the particular printing device to require successful authentication of the user prior to allowing the electronic document to be printed at the printing device, and the print data includes data that indicates that locked printing is specified for the electronic document.

7. A computer-implemented method for generating print data at a client device, the computer-implemented method comprising:

a user interface on the client device displaying information to users and receiving user input from the users;

an application program executing on the client device and generating an electronic document; and a print driver executing on the client device and corresponding to a particular printing device:

causing a graphical user interface to be displayed on the user interface, wherein the graphical user interface allows a user to specify one or more attributes of one or more access policies that are to be used to control user access to the electronic document at the particular printing device, and generating print data that includes a plurality of print commands which, when processed by the particular printing device, cause a printed version of the electronic document to be generated at the printing device, wherein if the one or more attributes of the one or more access policies are specified for the electronic document, then the print data includes data that indicates the one or more attributes of the one or more access policies that are to be used to control user access to the electronic document at the particular printing device.

8. The computer-implemented method as recited in claim 7, wherein the one or more attributes of the one or more access policies include one or more of a name of an access policy, a location of an access policy and URL of a policy server that stores the one or more access policies.

9. The computer-implemented method as recited in claim 7, wherein the computer-implemented method further comprises the print driver generating the print commands in Print Job Language (PJL) format.

10. The computer-implemented method as recited in claim 7, wherein the computer-implemented method further comprises the print driver causing to be displayed on the graphical user interface a list of available access policies and one or more user graphical user interface objects that allow the user to select one or more of the available access policies.

11. The computer-implemented method as recited in claim 7, wherein the computer-implemented method further comprises the print driver:

retrieving an encryption key from a document policy management system, encrypting the print data using the encryption key, and causing the encrypted print data to be transmitted to the printing device.

12. The computer-implemented method as recited in claim 7, further comprising:

the graphical user interface allowing a user to specify locked printing for the electronic document, wherein the specification of locked printing for the electronic document causes the particular printing device to require successful authentication of the user prior to allowing the electronic document to be printed at the printing device, and the print data includes data that indicates that locked printing is specified for the electronic document.

13. A computer-readable medium for generating print data at a client device, the computer-readable medium storing instructions which, when processed by one or more processors, causes:

a user interface on the client device displaying information to users and receiving user input from the users;

an application program executing on the client device to generate an electronic document; and a print driver executing on the client device and corresponding to a particular printing device:

causing a graphical user interface to be displayed on the user interface, wherein the graphical user interface allows a user to specify one or more attributes of one or more access policies that are to be used to control user access to the electronic document at the particular printing device, and generating print data that includes a plurality of print commands which, when processed by the particular printing device, cause a printed version of the electronic document to be generated at the printing device, wherein if the one or more attributes of the one or more access policies are specified for the electronic document, then the print data includes data that indicates the one or more attributes of the one or more access policies that are to be used to control user access to the electronic document at the particular printing device.

14. The computer-readable medium as recited in claim 13, wherein the one or more attributes of the one or more access policies include one or more of a name of an access policy, a location of an access policy and URL of a policy server that stores the one or more access policies.

15. The computer-readable medium as recited in claim 13, wherein the computer-readable medium stores additional instructions which, when processed by the one or more processors, causes the print driver to generate the print commands in Print Job Language (PJL) format.

16. The computer-readable medium as recited in claim 13, wherein the computer-readable medium stores additional instructions which, when processed by the one or more processors, causes the print driver to cause to be displayed on the graphical user interface a list of available access policies and one or more user graphical user interface objects that allow the user to select one or more of the available access policies.

17. The computer-readable medium as recited in claim 13, wherein the computer-readable medium stores additional instructions which, when processed by the one or more processors, causes the print driver to:

retrieve an encryption key from a document policy management system, encrypt the print data using the encryption key, and cause the encrypted print data to be transmitted to the printing device.

18. The computer-readable medium as recited in claim 13, wherein the computer-readable medium stores additional instructions which, when processed by the one or more processors, causes:

the graphical user interface to allow a user to specify locked printing for the electronic document, wherein the specification of locked printing for the electronic document causes the particular printing device to require successful authentication of the user prior to allowing the electronic document to be printed at the printing device, and the print data includes data that indicates that locked printing is specified for the electronic document.

* * * * *